(12) United States Patent
Diercks et al.

(10) Patent No.: US 9,471,952 B2
(45) Date of Patent: Oct. 18, 2016

(54) METHOD AND SYSTEM FOR COORDINATED DATA EXECUTION USING A PRIMARY GRAPHICS PROCESSOR AND A SECONDARY GRAPHICS PROCESSOR

(71) Applicant: NVIDIA Corporation, Santa Clara, CA (US)

(72) Inventors: Dwight D. Diercks, San Francisco, CA (US); Abraham B. De Waal, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/759,401

(22) Filed: Feb. 5, 2013

(65) Prior Publication Data

US 2014/0055465 A1 Feb. 27, 2014

Related U.S. Application Data

(63) Continuation of application No. 10/390,120, filed on Mar. 14, 2003, now Pat. No. 8,749,561.

(51) Int. Cl.
 *G06T 1/20* (2006.01)
 *G06T 15/00* (2011.01)
 *G09G 5/36* (2006.01)

(52) U.S. Cl.
 CPC ............. *G06T 1/20* (2013.01); *G06T 15/005* (2013.01); *G09G 5/363* (2013.01)

(58) Field of Classification Search
 CPC ........ G06T 1/20; G06T 15/005; G09G 5/363

USPC ....... 345/502, 542, 503, 505, 501, 530, 531, 345/536

See application file for complete search history.

(56) References Cited

U.S. PATENT DOCUMENTS

| | | | |
|---|---|---|---|
| 4,603,400 A | 7/1986 | Daniels | |
| 4,955,066 A | 9/1990 | Notenboom | |
| 5,016,001 A | 5/1991 | Minagawa et al. | |
| 5,321,510 A | 6/1994 | Childers et al. | |
| 5,371,847 A | 12/1994 | Hargrove | |
| 5,461,679 A * | 10/1995 | Normile et al. | ............. 382/304 |
| 5,517,612 A | 5/1996 | Dwin et al. | |
| 5,687,334 A | 11/1997 | Davis et al. | |
| 5,712,995 A | 1/1998 | Cohn | |

(Continued)

FOREIGN PATENT DOCUMENTS

WO 2005026918 3/2005

OTHER PUBLICATIONS

"Epson; EMP Monitor V4, 10 Operation Guide", by Seiko Epson Corp., 2006 http://support.epson.ru/products/manuals/100396/Manual/EMPMonitor.pdf Nov. 2, 2006.

(Continued)

*Primary Examiner* — Joni Richer

(57) ABSTRACT

A method and system for coordinated data execution in a computer system. The system includes a first graphics processor coupled to a first memory and a second graphics processor coupled to a second memory. A graphics bus is configured to couple the first graphics processor and the second graphics processor. The first graphics processor and the second graphics processor are configured for coordinated data execution via communication across the graphics bus.

19 Claims, 6 Drawing Sheets

(56) References Cited

U.S. PATENT DOCUMENTS

| | | | |
|---|---|---|---|
| 5,768,164 A | 6/1998 | Hollon, Jr. | |
| 5,781,199 A * | 7/1998 | Oniki et al. | 345/505 |
| 5,841,435 A | 11/1998 | Dauerer et al. | |
| 5,878,264 A | 3/1999 | Ebrahim | |
| 5,900,913 A | 5/1999 | Tults | |
| 5,917,502 A | 6/1999 | Kirkland et al. | |
| 5,923,307 A | 7/1999 | Hogle, IV | |
| 5,978,042 A | 11/1999 | Vaske et al. | |
| 6,008,809 A | 12/1999 | Brooks | |
| 6,018,340 A | 1/2000 | Butler et al. | |
| 6,025,853 A | 2/2000 | Baldwin | |
| 6,075,531 A | 6/2000 | DeStefano | |
| 6,078,339 A | 6/2000 | Meinerth et al. | |
| 6,191,758 B1 | 2/2001 | Lee | |
| 6,208,273 B1 | 3/2001 | Dye et al. | |
| 6,226,237 B1 | 5/2001 | Chan et al. | |
| 6,259,460 B1 | 7/2001 | Gossett et al. | |
| 6,337,747 B1 | 1/2002 | Rosenthal | |
| 6,359,624 B1 | 3/2002 | Kunimatsu | |
| 6,388,671 B1 * | 5/2002 | Yoshizawa et al. | 345/505 |
| 6,473,086 B1 | 10/2002 | Morein et al. | |
| 6,480,198 B2 | 11/2002 | Kang | |
| 6,483,502 B2 | 11/2002 | Fujiwara | |
| 6,498,721 B1 | 12/2002 | Kim | |
| 6,557,065 B1 * | 4/2003 | Peleg et al. | 710/300 |
| 6,600,500 B1 | 7/2003 | Yamamoto | |
| 6,628,243 B1 | 9/2003 | Lyons et al. | |
| 6,630,943 B1 | 10/2003 | Nason et al. | |
| 6,654,826 B1 | 11/2003 | Cho et al. | |
| 6,657,632 B2 | 12/2003 | Emmot et al. | |
| 6,724,403 B1 | 4/2004 | Santoro et al. | |
| 6,753,878 B1 | 6/2004 | Heirich et al. | |
| 6,771,264 B1 * | 8/2004 | Duluk et al. | 345/426 |
| 6,774,912 B1 | 8/2004 | Ahmed et al. | |
| 6,784,855 B2 | 8/2004 | Matthews et al. | |
| 6,816,977 B2 | 11/2004 | Brakmo et al. | |
| 6,832,269 B2 * | 12/2004 | Huang et al. | 710/11 |
| 6,832,355 B1 | 12/2004 | Duperrouzel et al. | |
| 6,956,542 B2 | 10/2005 | Okuley et al. | |
| 7,007,070 B1 | 2/2006 | Hickman | |
| 7,010,755 B2 | 3/2006 | Anderson et al. | |
| 7,030,837 B1 | 4/2006 | Vong et al. | |
| 7,034,776 B1 | 4/2006 | Love | |
| 7,124,360 B1 | 10/2006 | Drenttel et al. | |
| 7,129,909 B1 | 10/2006 | Dong et al. | |
| 7,184,003 B2 * | 2/2007 | Cupps et al. | 345/30 |
| 7,212,174 B2 | 5/2007 | Johnston et al. | |
| 7,269,797 B1 | 9/2007 | Bertocci et al. | |
| 7,359,998 B2 | 4/2008 | Chan et al. | |
| 7,486,279 B2 | 2/2009 | Wong et al. | |
| 7,509,444 B2 | 3/2009 | Chiu et al. | |
| 7,552,391 B2 | 6/2009 | Evans et al. | |
| 7,558,884 B2 | 7/2009 | Fuller et al. | |
| 7,612,783 B2 | 11/2009 | Koduri et al. | |
| 8,176,155 B2 | 5/2012 | Yang et al. | |
| 2001/0028366 A1 | 10/2001 | Ohki et al. | |
| 2002/0087225 A1 | 7/2002 | Howard | |
| 2002/0129288 A1 | 9/2002 | Loh et al. | |
| 2002/0140627 A1 | 10/2002 | Ohki et al. | |
| 2002/0163513 A1 | 11/2002 | Tsuji | |
| 2002/0182980 A1 | 12/2002 | Van Rompay | |
| 2002/0186257 A1 | 12/2002 | Cadiz et al. | |
| 2003/0016205 A1 | 1/2003 | Kawabata et al. | |
| 2003/0025689 A1 | 2/2003 | Kim | |
| 2003/0041206 A1 | 2/2003 | Dickie | |
| 2003/0065934 A1 | 4/2003 | Angelo et al. | |
| 2003/0088800 A1 | 5/2003 | Cai | |
| 2003/0090508 A1 | 5/2003 | Keohane et al. | |
| 2003/0126335 A1 | 7/2003 | Silverster | |
| 2003/0188144 A1 | 10/2003 | Du et al. | |
| 2003/0189597 A1 | 10/2003 | Anderson et al. | |
| 2003/0195950 A1 | 10/2003 | Huang et al. | |
| 2003/0197739 A1 | 10/2003 | Bauer | |
| 2003/0200435 A1 | 10/2003 | England et al. | |
| 2003/0222876 A1 | 12/2003 | Giemborek et al. | |
| 2004/0001069 A1 * | 1/2004 | Snyder et al. | 345/582 |
| 2004/0019724 A1 | 1/2004 | Singleton et al. | |
| 2004/0027315 A1 | 2/2004 | Senda et al. | |
| 2004/0080482 A1 | 4/2004 | Magendanz et al. | |
| 2004/0085328 A1 | 5/2004 | Maruyama et al. | |
| 2004/0184523 A1 | 9/2004 | Dawson et al. | |
| 2004/0222978 A1 | 11/2004 | Bear et al. | |
| 2004/0224638 A1 | 11/2004 | Fadell et al. | |
| 2004/0225901 A1 | 11/2004 | Bear et al. | |
| 2004/0225907 A1 | 11/2004 | Jain et al. | |
| 2004/0235532 A1 | 11/2004 | Matthews et al. | |
| 2004/0268004 A1 | 12/2004 | Oakley | |
| 2005/0025071 A1 | 2/2005 | Miyake et al. | |
| 2005/0059346 A1 | 3/2005 | Gupta et al. | |
| 2005/0064911 A1 | 3/2005 | Chen et al. | |
| 2005/0066209 A1 | 3/2005 | Kee et al. | |
| 2005/0073515 A1 | 4/2005 | Kee et al. | |
| 2005/0076088 A1 | 4/2005 | Kee et al. | |
| 2005/0076256 A1 | 4/2005 | Fleck et al. | |
| 2005/0097506 A1 | 5/2005 | Heumesser | |
| 2005/0140566 A1 | 6/2005 | Kim et al. | |
| 2005/0182980 A1 | 8/2005 | Sutardja | |
| 2005/0240538 A1 | 10/2005 | Ranganathan | |
| 2005/0262302 A1 | 11/2005 | Fuller et al. | |
| 2006/0001595 A1 | 1/2006 | Aoki | |
| 2006/0007051 A1 | 1/2006 | Bear et al. | |
| 2006/0085760 A1 | 4/2006 | Anderson et al. | |
| 2006/0095617 A1 | 5/2006 | Hung | |
| 2006/0119537 A1 | 6/2006 | Vong et al. | |
| 2006/0119538 A1 | 6/2006 | Vong et al. | |
| 2006/0119602 A1 | 6/2006 | Fisher et al. | |
| 2006/0125784 A1 | 6/2006 | Jang et al. | |
| 2006/0129855 A1 | 6/2006 | Rhoten et al. | |
| 2006/0130075 A1 | 6/2006 | Rhoten et al. | |
| 2006/0150230 A1 | 7/2006 | Chung et al. | |
| 2006/0164324 A1 | 7/2006 | Polivy et al. | |
| 2006/0232494 A1 | 10/2006 | Lund et al. | |
| 2006/0250320 A1 | 11/2006 | Fuller et al. | |
| 2006/0267857 A1 | 11/2006 | Zhang et al. | |
| 2006/0267987 A1 | 11/2006 | Litchmanov | |
| 2006/0267992 A1 | 11/2006 | Kelley et al. | |
| 2006/0282855 A1 | 12/2006 | Margulis | |
| 2007/0046562 A1 | 3/2007 | Polivy et al. | |
| 2007/0052615 A1 | 3/2007 | Van Dongen et al. | |
| 2007/0067655 A1 | 3/2007 | Shuster | |
| 2007/0079030 A1 | 4/2007 | Okuley et al. | |
| 2007/0083785 A1 | 4/2007 | Sutardja | |
| 2007/0103383 A1 | 5/2007 | Sposato et al. | |
| 2007/0195007 A1 | 8/2007 | Bear et al. | |
| 2007/0273699 A1 | 11/2007 | Sasaki et al. | |
| 2008/0130543 A1 | 6/2008 | Singh et al. | |
| 2008/0155478 A1 | 6/2008 | Stross | |
| 2008/0172626 A1 | 7/2008 | Wu | |
| 2008/0297433 A1 | 12/2008 | Heller et al. | |
| 2008/0320321 A1 | 12/2008 | Sutardja | |
| 2009/0021450 A1 | 1/2009 | Heller et al. | |
| 2009/0031329 A1 | 1/2009 | Kim | |
| 2009/0059496 A1 | 3/2009 | Lee | |
| 2009/0160865 A1 | 6/2009 | Grossman | |
| 2009/0172450 A1 | 7/2009 | Wong et al. | |
| 2009/0193243 A1 | 7/2009 | Ely | |
| 2010/0010653 A1 | 1/2010 | Bear et al. | |
| 2010/0033433 A1 | 2/2010 | Utz et al. | |
| 2010/0033916 A1 | 2/2010 | Douglas et al. | |

OTHER PUBLICATIONS

"Graphics: Intel 82852/82855 Graphics Controller Family", Intel, Archived Nov. 2, 2006 by Archive.org, Downloaded Jun. 30, 2011, http://web.archive.org/web/20061103045644/http://support.epson.ru/products/manuals/100396/manual/empmonitor.pdf Nov. 2, 2006.

"Virtual Network Computing", http://en.wikipedia.org/wiki/Vnc, Downloaded Circa: Dec. 18, 2008, pp. 1-4.

"The Java Tutorial: How to Use Combo Boxes", Archived Mar. 5, 2006 by archive.org, Downloaded Jun. 30, 2011, http://web.archive.org/web/20050305000852/http://www.mips.unice.fr/Doc/Java/Tutorial/uiswing/components/combobox.html.

(56) References Cited

OTHER PUBLICATIONS

"Usage: NVIDIA Geforce 6800-PCIE X16", Dell, Archived January 15th, 2006 by Archive.org, Downloaded Jun. 29, 2011, http://web.archive.org/web/20060115050119/http://suppot.dell.com/Support/Edocs/video/P82192/En/Usage.htm.

"Graphics: Intel® 82852/828b5 Graphics Controller Family", Intel, Archived Nov. 2, 2006 by archive.org, Downloaded Jun. 30, 2011, http://web.archive.org/web/20061103045644/http://www.intel.com/support/graphics/intel852gm/sb/CS-009064.htm? (Per 37 C.F.R. 1.98(d), this reference is not required and is not submitted because this reference was previously cited by or submitted to the PTO in prior U.S. Appl. No. 10/390,120 to which the present application.

"Epson: EMP Monitor V4.10 Operation Guide", by Seiko Epson Corp., 2006, http://support.epson.ru/products/manuals/100396/Manual/EMPMonitor.pdf month unknown (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

"System Management Bus (SMBus) Specification," Version 2.0, Aug. 3, 2000; pp. 1-59. (Per 37 C.F.R. 1.98(d) this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

Handtops.com, "FlipStart PC in Detail" pp. 1-4, downloaded from the internet o Sep. 20, 2005 from http://www.handtops.com/show/news/5. (Per 37 C.F.R. 1.98(d), this reference is not required and is not submitted because this reference was previously cited by or submitted to the PTO in prior parent U.S. Appl. No. 10/390,120 to which the present U.S. Appl. No. 13/759,401 claims priority under 35 U.S.C. 120 for an earlier effective filing date).

Microsoft Corporation, "Microsoft Windows Hardware Showcase", dated Apr. 28, 2005; pp. 1-5; downloaded from the internet on Sep. 15, 2005, from http://www.microsoft.com/whdc/winhe/hwshowcase05.mspx. (Per 37 C.F.R. 1.98(d), a copy of this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

Paul Thurrot's SuperSite or Windows, "WinHEC 2004 Longhorn Prototypes Gallery", dated May 10, 2004, pp. 1-4, downloaded from the internet on Sep. 15, 2005 from http://www.sinwupersite.com/showcase.loghom_winhc_proto.asp. (Per 37 C.F.R. 1.98(d), this reference is not required and is not submitted because this reference was previously cited by or submitted to the PTO in prior U.S. Appl. No. 10/390,120 to which the present application.

PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp. (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

Vulcan Inc., "Connectivity FAQ", p. 1, downloaded from the Internet on Sep. 20, 2005 from http://www.lipstartpc.com/faq_connectivity.asp. (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

Vulcan, Inc., "Product Features:LID Module", p. 1, downloaded from the Internet on Sep. 19, 2005 from http://www.flipstartpc.com/aboutproduct_features_lidmodule.asp. (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

Vulcan, Inc., "Product Features: Size and performanc", p. 1; downloaded from the internet on Sep. 20, 2005 from http://www.flipstartpc.com/aboutproduct_features_sizeandpower.asp. (Per 37 C.F.R. 1.98(d), this reference is not required and is not submitted because this reference was previously cited by by or submitted to the PTO in prior U.S. Appl. No. 10/390,120 to which the present U.S. Appl. No. 13/759,401 claims priority under 35 U.S.C. 120 for an earlier effective filing date).

Vulcan, Inc., "Software FAQ", p. 1, download from the internet on Sep. 20, 2005 from http://www.flipstartpc.com/faq_software.asp. (Per 37 C.F.R. 1.98(d), a copy of this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

Andrew Fuller; "Auxilliary Display Platform in Longhorn"; Microsoft Corporation; The Microsoft Hardware Engineering Conference Apr. 25-27, 2005; slides 1-29. (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

Compaq et al.; "Universal Serial Bus Specification"; Apr. 27, 2000; Revision 2.0; chapters 1-4 and 10. (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

Nerheim-Wolfe, R. Overview of Aliasing in Computer Graphics. 1993. 1993 ACM SIGGRAPH Education Slide Set. http://www.siggraph.org/education/materials/HyperGraph/aliasing/alias0.ht-m. Aug. 1993 (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

Breitfelder, K.; Messina, D. The Authorative Dictionary of IEEE Standards Terms. 2000. IEEE Press. Seventh Edition, p. 144, 1037. Dec. 1, 2000 (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

"Front side bus." http://www.answers.com/topic/front-side-bus. Feb. 2005 (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

"AGP—Accelerated Graphics Port." http://www.sysopt.com/agp.html. Jan. 11, 1998 (Per 37 C.F.R. 1.98(d), this reference is not required and is not submitted because this reference was previously cited by or submitted to the PTO in prior U.S. Appl. No. 10/390,120 to which the present U.S. Appl. No. 13/759,401 claims priority under 35 U.S.C. 120 for an earlier effective filing date).

* cited by examiner

METHOD AND SYSTEM FOR COORDINATED DATA EXECUTION USING A PRIMARY GRAPHICS PROCESSOR AND A SECONDARY GRAPHICS PROCESSOR

RELATED U.S. APPLICATION

This application is a continuation application of and claims priority to the copending patent application entitled, "A Method and System for Coordinated Data Execution Using a Primary Graphics Processor and a Secondary Graphics" by Diercks, D. and De Waal, A., with Ser. No. 10/390,120, filed Mar. 14, 2003, hereby incorporated by reference in its entirety.

FIELD OF THE INVENTION

The field of the present invention pertains to digital electronic computer systems. More particularly, the present invention relates to a system for coordinating the operation of multiple graphics processor units within a computer system.

BACKGROUND OF THE INVENTION

Digital computers are being used today to perform a wide variety of tasks. A primary means for interfacing a computer system with its user is through its graphics display. The graphical depiction of data, through, for example, full motion video, detailed true color images, photorealistic 3-D modeling, and the like, has become a preferred mechanism for presenting complex data to the user. Increasing the performance and/or the realism of interactive three-dimensional images and scenes has become a primary driver for the increasing performance of newer computer systems.

Generally, a desktop computer system equipped to handle 3-D image data includes a specialized graphics processor unit, or GPU, in addition to the traditional CPU. The GPU includes specialized hardware configured to handle 3-D computer-generated objects. In a typical 3D computer generated object, the surfaces of the 3D object are described by data models. The GPU is configured to operate on these data models and their constituent "primitives" (usually mathematically described polygons and polyhedra) that define the shape of the object, the object attributes, and the connectivity and positioning data describing how the objects fit together. Generally, the component polygons and polyhedra connect at common edges defined in terms of common vertices and enclosed volumes. The hardware of the GPU processes the objects, implementing the calculations required to produce the realistic 3-D images. The GPU processing results in the polygons being texture mapped, Z-buffered, and shaded onto an array of pixels, creating the realistic 3D image.

In a typical graphics computer system, most of the processor intensive rendering computations are performed by the GPU included in the computer system. For example, the 3D object data models are "traversed" by a graphics driver software program (e.g., in response to user input) running on both the GPU and CPU of the computer system. Generally, the primitives describing the 3D object are processed by the CPU and sent to the GPU for rendering. For example, a 3D polyhedra model of an object is sent to the GPU as contiguous strips of polygons, comprising a graphics data stream (e.g., primitives, rendering commands, instructions, etc.). This graphics data stream provides the GPU with the information required to render the 3D object and the resulting scene. Such information includes, for example, specular highlighting, anti-aliasing, depth, transparency, and the like. Using this information, the GPU performs all the computational processing required to realistically render the 3D object. The hardware of the GPU is specially tuned to perform such processing quickly and efficiently in comparison to the CPU.

The performance of a typical graphics rendering process as implemented on a graphics computer system is highly dependent upon the performance of the underlying hardware. High performance graphics rendering requires high data transfer bandwidth to the memory storing the 3-D object data and the constituent primitives. Thus, typical prior art GPU subsystems (e.g., GPU equipped graphics cards) typically include a specialized high bandwidth local graphics memory for feeding the required data to the GPU.

A problem with the typical prior art GPU subsystems is the fact that the data transfer bandwidth to the system memory, or main memory, of a computer system is much less than the data transfer bandwidth to the local graphics memory. A GPU subsystem needs to communicate with system memory in order to exchange data with the CPU and interact with programs executing on the CPU. This communication occurs across a graphics bus, or the bus that connects the graphics subsystem to the CPU and system memory. For example, 3-D objects and their primitives need to be transferred from a program executing on the CPU and on system memory into the local graphics memory of the graphics subsystem for rendering. The low data transfer bandwidth of the graphics bus acts as a bottleneck on overall graphics rendering performance.

The problem with respect to the low data transfer bandwidth of the graphics bus constricts the flow of data in both directions. For example, the low data transfer bandwidth of the graphics bus acts as a bottleneck for those applications where data needs to be read back from the graphics subsystem to the CPU. Such applications include, for example, post-transform applications where 3-D object data after transformation needs to be read back to the CPU for use by programs executing on the CPU. Thus, even though the CPU is designed to have a very high data transfer bandwidth to system memory, programs executing on the CPU and the system memory are constricted by the very much lower data transfer bandwidth of the graphics bus, as for example, a real-time 3-D application waits for post-transform information from the graphics subsystem.

Thus, what is required is a solution capable of overcoming the limitations imposed by the limited data transfer bandwidth of a graphics bus of a computer system. What is required is a solution that eliminates the bottleneck imposed by the much smaller data transfer bandwidth of the graphics bus in comparison to the data transfer bandwidth of the GPU to local graphics memory and the CPU to system memory. The present invention provides a novel solution to the above requirements.

SUMMARY OF THE INVENTION

Embodiments of the present invention provided a method and system for coordinated data execution using a primary graphics processor and a secondary graphics processor. Embodiments of the present invention overcome the limitations imposed by the limited data transfer bandwidth of a graphics bus of a computer system. Additionally, embodiments of the present invention eliminate the bottleneck imposed by the much smaller data transfer bandwidth of the graphics bus in comparison to the data transfer bandwidth of the GPU to local graphics memory and the CPU to system memory.

In one embodiment, the present invention is implemented as a graphics computer system configured to implement a coordinated data execution process using two graphics processors. In this embodiment, the system includes a first graphics processor coupled to a first memory and a second graphics processor coupled to a second memory. A graphics bus is configured to couple the first graphics processor and the second graphics processor. The first graphics processor and the second graphics processor are configured for coordinated data execution via communication across the graphics bus.

In one embodiment, the first memory comprises a local graphics memory and the second memory comprises a system memory. The first graphics processor can be detachably coupled to the graphics bus by a connector. The second graphics processor can be integrated with a memory controller for the system memory. The first and second graphics processors function together in a coordinated manner to minimize the amount of data that is required to be transferred across the graphics bus.

In one embodiment, the first graphics processor is a detachable GPU equipped graphics card configured to perform those graphics operations that are most suited to the very high data transfer bandwidth between the first graphics processor and local graphics memory. The second graphics processor is an integrated graphics processor (e.g., an iGPU) within a Northbridge configured to perform those graphics operations that are most suited to the very high data transfer bandwidth between the second graphics processor and system memory.

In this manner, the coordinated operation of the first graphics processor and the second graphics processor reduces the amount of data required for transfer across the graphics bus, and thereby overcomes the limitations imposed by the limited data transfer bandwidth of the graphics bus.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provided a method and system for coordinated data execution using a primary graphics processor and a secondary graphics processor. Embodiments of the present invention overcome the limitations imposed by the limited data transfer bandwidth of a graphics bus of a computer system. Additionally, embodiments of the present invention eliminate the bottleneck imposed by the much smaller data transfer bandwidth of the graphics bus in comparison to the data transfer bandwidth of the GPU to local graphics memory and the CPU to system memory. Embodiments of the present invention and their benefits are further described below.

Figure 1:
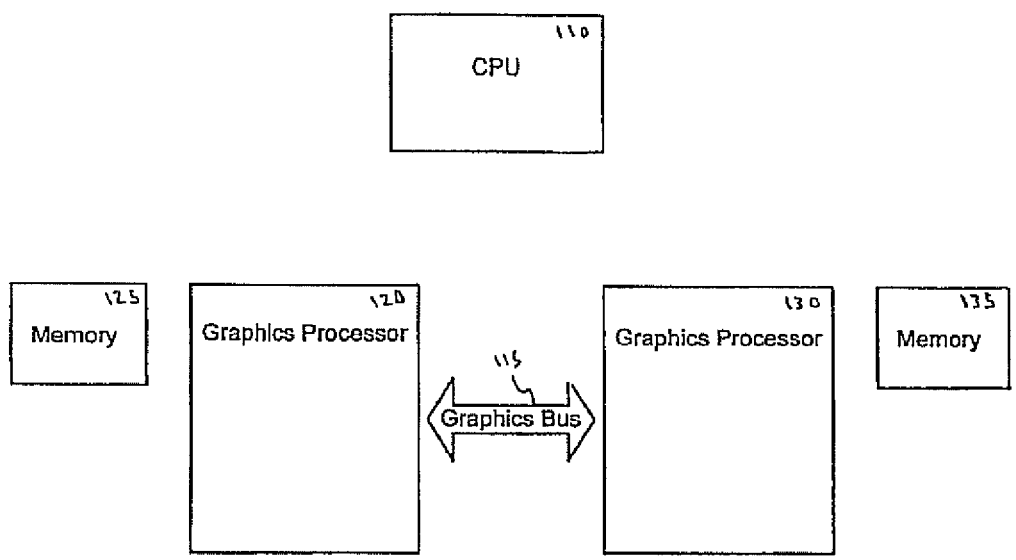
FIG. 1 shows a basic system in accordance with one embodiment of the present invention.
Figure 2:
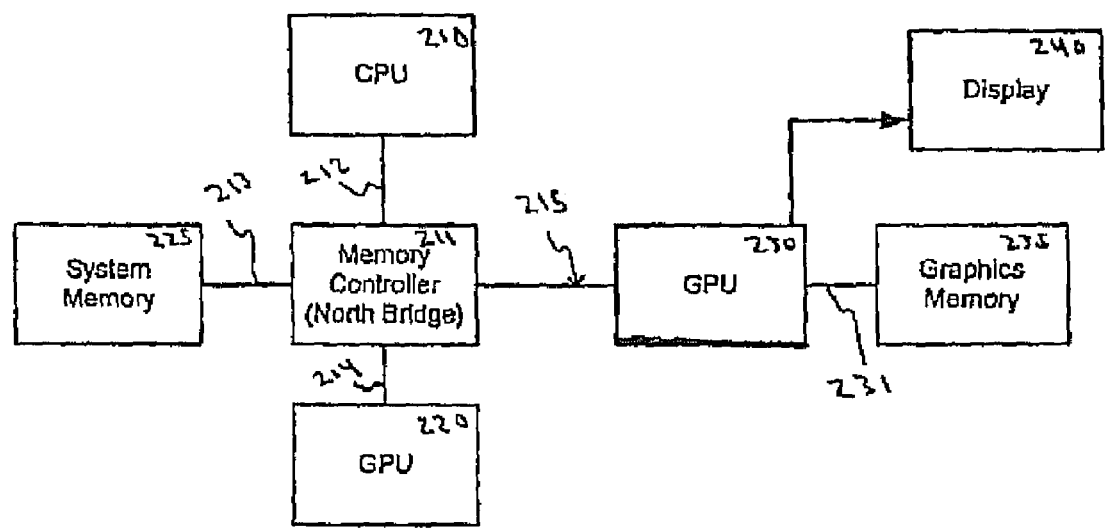
FIG. 2 shows a more detailed system including a memory controller in accordance with one embodiment of the present invention.
Figure 3:
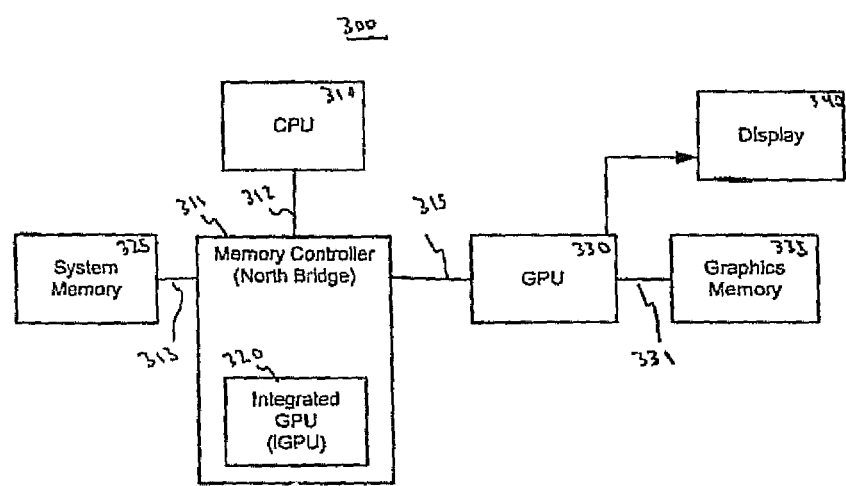
FIG. 3 shows an integrated graphics processor system in accordance with one embodiment of the present invention.

FIG. 1 through FIG. 3 show example configurations of computer systems in accordance with embodiments of the present invention. Referring to FIG. 1, FIG. 1 shows a system 100 in accordance with one embodiment of the present invention. FIG. 1 depicts a basic configuration of a system for implementing coordinated data execution using a first graphics processor 130 and a second graphics processor 120. As depicted in FIG. 1, system 100 includes a CPU 110 and a memory 125 coupled to the graphics processor 120 and a memory 135 coupled to the graphics processor 130.

The graphics processors 120-130 communicate with each other across a graphics bus 115 to facilitate the coordinated processing. The system 100 embodiment performs graphics processing to support applications executing on the CPU 110. To implement the graphics processing, the processing workload is shared between the graphics processor 120 and the graphics processor 130. The graphics processing implemented on each of the graphics processors 120-130 is coordinated in order to minimize the impact of the limited data transfer bandwidth of the graphics bus 115. The graphics processing can be shared between the graphics processors in order to exploit any parallelism, or concurrent execution properties, which may be present in an application.

The system 100 embodiment shows the memory 125 and the memory 135 for the graphics processors 120-130 respectively. In the present embodiment, the data transfer bandwidth of the busses between the graphics processor 120 and the memory 125 and between the graphics processor 130 and the memory 135 is much greater than the data transfer bandwidth of the graphics bus 115.

FIG. 2 shows a system 200 in accordance with one embodiment of the present invention. FIG. 2 depicts a more detailed configuration of a system for implementing coordinated data execution using a first graphics processor 230 and a second graphics processor 220. As depicted in FIG. 2, system 200 includes a CPU 210 and a memory 225 coupled to the GPU (graphics processor unit) 220 via a memory controller 211.

In the system 200 embodiment shown in FIG. 2, the first memory comprises a local graphics memory 235 and the second memory comprises a system memory 225. A memory controller 211 provides the interconnection between the system memory 225, the CPU 210, and the GPU 220 through the busses 212-214. A graphics bus 215 provides the interconnection between the GPU 220, the system memory 225, and the CPU 210. A local graphics memory 235 is directly coupled to the GPU 230 via a local bus 231. The rendered 3-D images are sent to a coupled display 240 for display to the user.

As with the system 100 embodiment of FIG. 1, the graphics processors 220-230 communicate with each other across the graphics bus 215 to facilitate the coordinated processing. The system 200 embodiment performs coordinated graphics processing, wherein the workload between the graphics processor 220 and the graphics processor 230 is shared in order to minimize the impact of the lower data transfer bandwidth of the graphics bus 215.

In this embodiment, the GPU 220 accesses the system memory 225 through the memory controller 211. The busses 212-214 are optimized high-speed busses configured to provide high data transfer bandwidth to the system memory 225. The GPU 230 accesses the local graphics memory 235 through an even higher performance local bus 231. The local bus 231 typically provides even greater data transfer bandwidth than the busses 212-214. In comparison, the graphics bus 215 is much slower than the local graphics bus 231 (e.g., an order of magnitude slower) and the busses 212-214.

FIG. 3 shows a system 300 in accordance with one embodiment of the present invention. FIG. 3 depicts a configuration of a system for implementing coordinated data execution wherein a second GPU 320 is integrated directly within the integrated circuit comprising a memory controller 311.

In this embodiment, the GPU 320 is integrated within the memory controller 311 and communicates with the system memory 325 across a system bus 313. The CPU communicates with the memory controller via a "front-side" bus 312. The memory controller 311 provides the communication pathway to the system memory 325 via the system bus 313.

As in the system 200 embodiment of FIG. 2, the busses 312-313 are high-speed busses. The GPU 330 communicates with a graphics memory 235 via a high-speed local bus 331 and the display 340 receives rendered graphics data from GPU 330 for display to the user. The graphics bus 315 is much slower than the local graphics bus 331 and the busses 312-313.

As with the system 200 embodiment of FIG. 2, the GPUs 320-330 communicate with each other across the graphics bus 315 to facilitate the coordinated processing. The system 300 embodiment performs coordinated graphics processing, wherein the workload between the graphics processor 320 and the graphics processor 330 is shared in order to minimize the impact of the lower data transfer bandwidth of the graphics bus 315.

Figure 4:
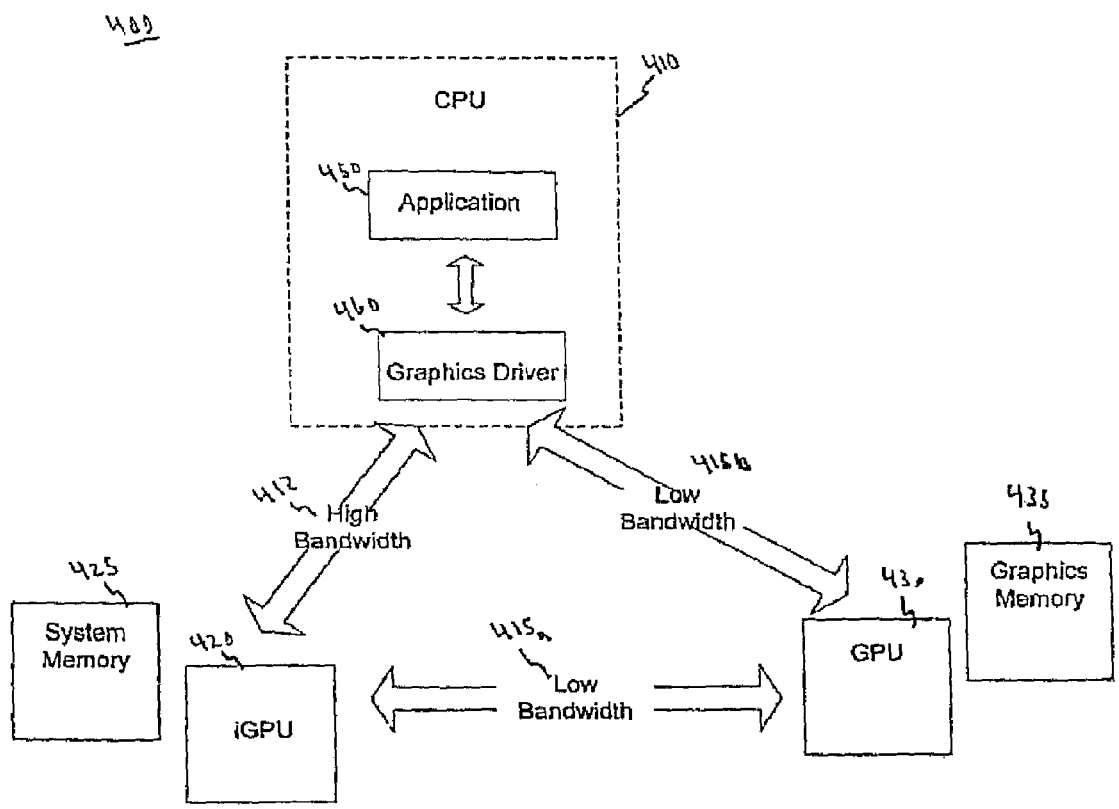
FIG. 4 shows a diagram depicting the software interaction of a coordinated GPU execution process of a system in accordance with one embodiment of the present invention.

FIG. 4 shows a diagram depicting the software interaction of a coordinated GPU execution process of a system 400 in accordance with one embodiment of the present invention. As shown in FIG. 4, a software application 450 is shown interacting with a graphics driver 460 as both of them execute within a CPU environment 410. The graphics driver 460 coordinates and dispatches the execution of the graphics processing by communicating with the GPU 420 and the GPU 430.

Referring still to FIG. 4, the system 400 embodiment shows the decisions the graphics driver 460 makes with regard to sharing the graphics processing load between the GPU 420 and the GPU 430. The system 400 embodiment shows an integrated GPU (iGPU) 420, similar to the integrated GPU 320 shown in FIG. 3. However, it should be noted that the system 400 embodiment is applicable to non-integrated GPUs, such as, the GPU 220 shown in FIG. 2. Accordingly, to aid the reader's understanding, the term primary GPU can be used to refer to the GPU coupled to a local graphics memory via a highly optimized, high-performance local bus (e.g., local bus 331 of FIG. 3) and the term secondary GPU can be used to refer to the GPU coupled to system memory.

In the system 400 embodiment, the graphics driver 460 splits the graphics processing workload in order to implement coordinated data execution using the primary graphics processor, in this case the GPU 430, and the secondary graphics processor, in this case the integrated GPU (iGPU) 420. The GPU 430 connects to a system memory controller across a graphics bus. The system memory controller is typically referred to as a Northbridge. The graphics bus is typically an industry standard AGP (accelerated graphics port) bus. The GPU 430 also communicates with the CPU 410, and thus the graphics driver 460 and the application 450, via the graphics bus. This is shown as the low bandwidth connections 415*a* and 415*b*. The GPU 430 is equipped for very high bandwidth communication with its local graphics memory 435, in the manner described above.

In the system 400 embodiment, the secondary graphics processor is integrated with the system memory controller on the same die, shown as iGPU 420. The iGPU 420 and GPU 430 communicate across the low bandwidth graphics bus, shown as the connection 415*a*. The iGPU 420 has a much faster access to system memory 425 in comparison to the GPU 430. This is due to the fact that the GPU 430 must transit the low bandwidth connection 415*a* of the graphics bus in order to access system memory 425.

In executing applications such as the application 450, (e.g., graphics rendering applications), the graphics driver 460 minimizes the penalties imposed by the low bandwidth connections 415*a* and 415*b* by coordinating the operation of the iGPU 420 and the GPU 430. In the present embodiment, graphics processing is apportioned between the iGPU 420 and the GPU 430 in order to best utilize their respective access speeds to the system memory 425 and local graphics memory 435, and in order to minimize the impact of the low bandwidth connections 415*a*-*b* to the GPU 430 (e.g., across the graphics bus). Additionally, communications bandwidth with the CPU 410 is much greater for the iGPU 420 (integrated in the memory controller) in comparison to the GPU 430.

Figure 5:
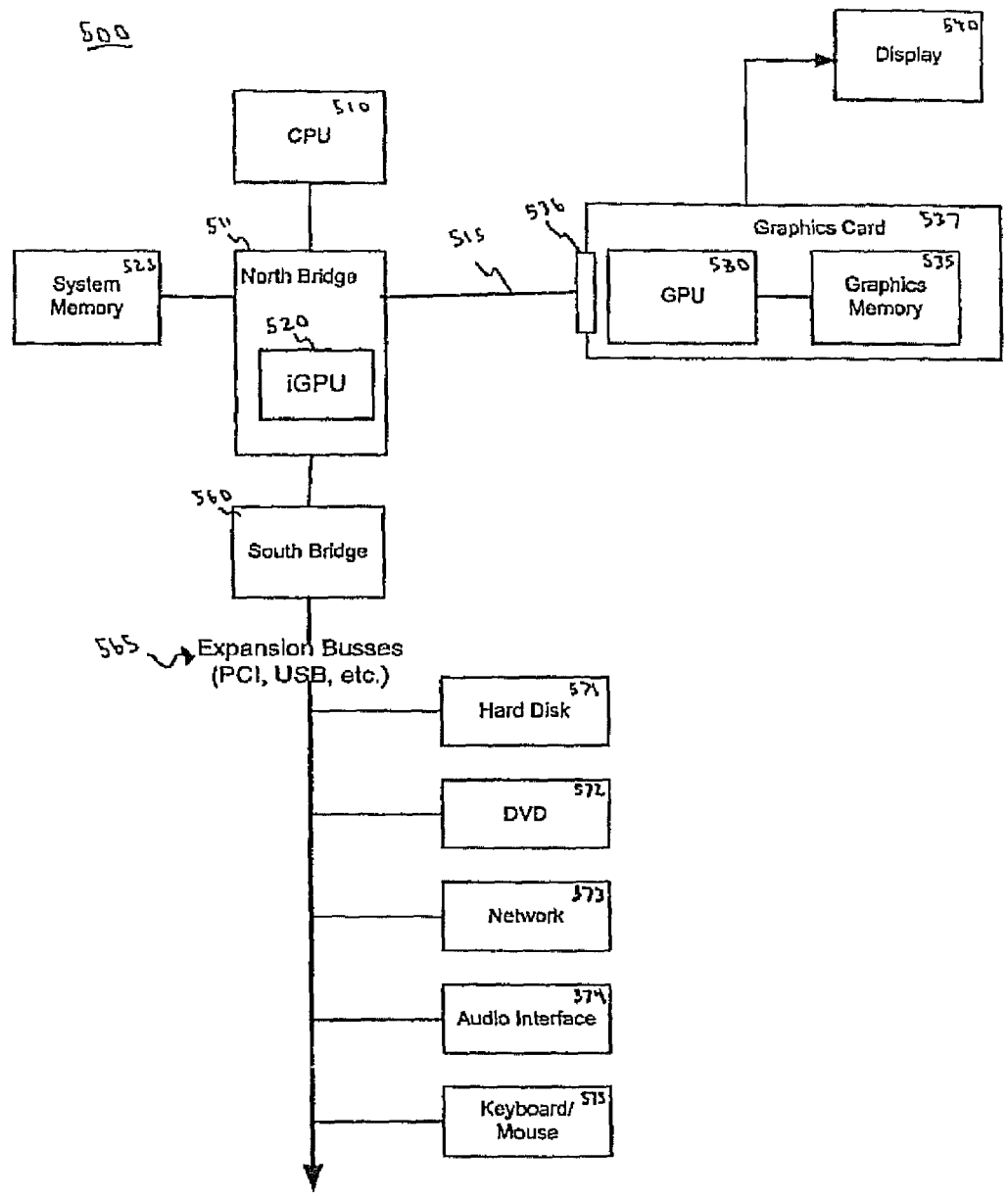
FIG. 5 shows a diagram of a system including a card-mounted GPU in accordance with one embodiment of the present invention.

The GPU 430 is typically a card-mounted GPU connected to an AGP slot of the graphics bus. The iGPU 420 is typically a more limited graphics processor integrated into the Northbridge chip. Such a configuration is shown in FIG. 5 below. The graphics driver software 460 is configured to implement load sharing between the GPU 430 and the iGPU 420 depending upon the type of data execution.

The iGPU 420 is well-suited for data execution of operations that occur in the first part of a graphics pipeline. Such operations include: transform, lighting, occlusion culling, back face culling, view frustum culling, clipping, and the like. These operations reduce the amount of data required for transfer across the limited bandwidth of the graphics bus (e.g., low bandwidth connections 415a-b) to the GPU 430.

The iGPU 420 is also well-suited for pre-processing data operations which best utilize high communications bandwidth with system memory and/or the CPU 410 (e.g., high bandwidth connection 412), such as: texture map reordering, texture compression, decryption and/or decoding of video (e.g., MPEG-2, MPEG-4, etc.), and certain vertex shader operations.

The iGPU 420 can be used to process commands from a processing thread that is different from the thread the GPU 430 is processing. For example, the iGPU 420 can render text for a word processor, while the GPU 430 renders 3D images to a different window. In this manner, the parallelism provided by the separate iGPU 420 can be exploited by software applications (e.g., application 450).

The GPU 430 is well-suited for the traditional graphics rendering operations which require extremely high communications bandwidth with the local graphics memory 435 (e.g., anti-aliasing, etc.), or those graphics rendering operations which occur later in a graphics rendering pipeline (e.g., lighting, bump mapping, texture mapping, and the like). As described above, the local graphics bus between a GPU and its local graphics memory is a highly specialized, highly optimized bus. Such busses (e.g., local bus 331 shown in FIG. 3) can be 256 bits wide and can have more than 19 GB/sec of data transfer bandwidth.

It should be noted that the iGPU 420 can be a much smaller graphics processor than the GPU 430. For example, the iGPU 420 can be implemented as a relatively simple unit of hardware logic (e.g., a single shader unit) designed to function in accordance with one embodiment of the present invention (e.g., by reducing the amount of data required to be transferred across the graphics bus).

It should also be noted that the iGPU can be configured to use a portion of the system memory 425 as its dedicated local memory. For example, the graphics driver software 460, in conjunction with the memory management software of an operating system, will reserve a portion of system memory 425 for its own use as a local graphics memory.

FIG. 5 shows a diagram of a system 500 including a card mounted GPU in accordance with one embodiment of the present invention. As shown in FIG. 5, a GPU 530 and its graphics memory 535 are mounted on a graphics card 537 and coupled to the graphics bus 515 of computer system 500 via a connector 536.

System 500 is substantially similar to system 400 of FIG. 4. System 500, however, explicitly shows the GPU 530 being card mounted and coupled to the graphics bus 515 via a detachable connector 536. In the present embodiment, the graphics card 537 is adapted to connect into an AGP slot-type connector 536. The graphics card 537 also connects to a display 540 (e.g., flat panel display, CRT display, etc.). In this embodiment, the graphics bus 515 is in accordance with a version of the AGP specification (AGP 4x, AGP 8x, etc.).

The iGPU 520 is integrated into a Northbridge memory controller chip 511, which connects to the CPU 510 and system memory 525. A "Southbridge" chip 560 connects to the Northbridge 511 and provides connectivity to the expansion busses 565. A plurality of optional peripheral devices 571-575 are connected to system 500 via the expansion busses 565 as shown.

Figure 6:
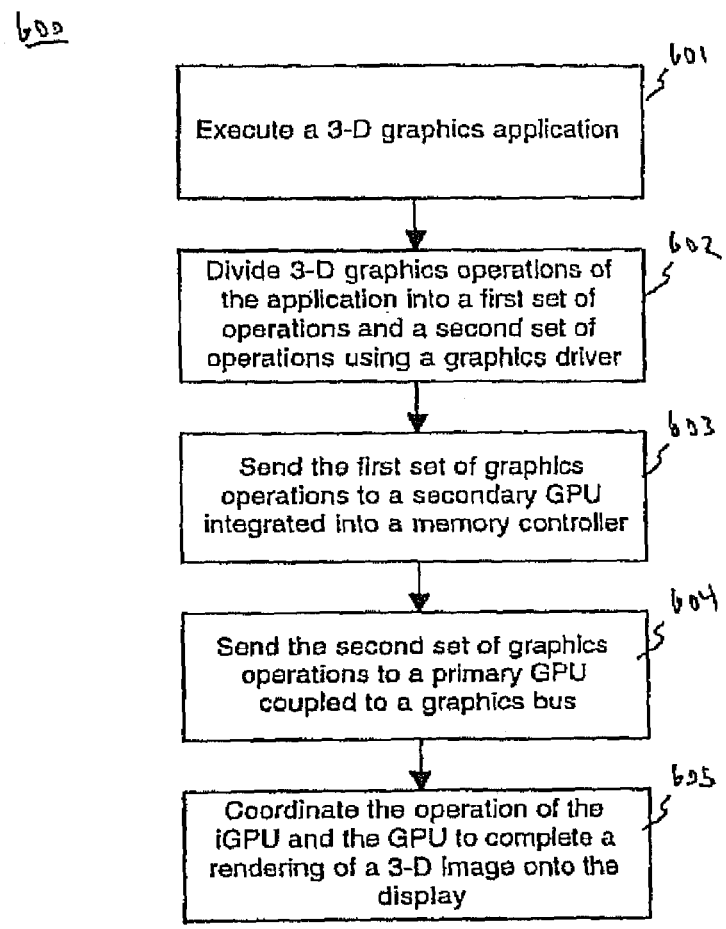
FIG. 6 shows a flow chart of the steps of a coordinated graphics rendering process in accordance with one embodiment of the present invention.

FIG. 6 shows a flow chart of the steps of a process 600 in accordance with one embodiment of the present invention. As depicted in FIG. 6, process 600 shows the operating steps of a coordinated graphics execution process as implemented on a iGPU-GPU equipped computer system (e.g., system 500 of FIG. 5).

Process 600 begins in step 601 where a 3-D graphics application is executed. The 3-D graphics application is primarily instantiated in system memory (e.g., system memory 525) and executes on the CPU (e.g., CPU 510). The graphics rendering operations of the application are handled through a graphics driver via the driver's API (application programming interface).

In step 602, the graphics operations are sent from the application to the graphics driver. The graphics operations are then divided into a first set of operations and a second set of operations. In the present embodiment, the first set of operations comprises those operations which occur earlier in a graphics rendering pipeline. As described above, such operations include, for example, transform, lighting, occlusion culling, back face culling, view frustum culling, clipping, and the like. The first set of operations can also include certain pre-processing data operations which best utilize high communications bandwidth with system memory and/or the CPU. The second set of operations comprises those operations which occur later in a graphics rendering pipeline, such as, for example, anti-aliasing, lighting, bump mapping, and the like.

In step 603, the first set of graphics operations are sent to the secondary iGPU 520. In step 604 the second set of graphics operations are sent to the primary GPU 530. Then in step 605, the operation of the iGPU 520 and the GPU 530 is coordinated via communication across the graphics bus (e.g., graphics bus 515). As described above, the division of work between the primary and secondary GPUs minimizes the amount of data required to be transferred across the low bandwidth graphics bus 515.

Thus, embodiments of the present invention provided a method and system for coordinated data execution using a primary graphics processor and a secondary graphics processor. Embodiments of the present invention overcome the limitations imposed by the limited data transfer bandwidth of a graphics bus of a computer system. Additionally, embodiments of the present invention eliminate the bottleneck imposed by the much smaller data transfer bandwidth of the graphics bus in comparison to the data transfer bandwidth of the GPU to local graphics memory and the CPU to system memory.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for coordinated operation of graphics processors, said system comprising: a first graphics processor coupled to a local graphics memory via a local bus; a second graphics processor communicatively coupled to a system memory via a memory controller, wherein the memory controller provides an interconnection between the system memory and the second graphics processor; and a graphic bus coupling the first graphics processor and the memory controller, wherein coordinated operation of the first graphics processor and the second graphics processor is based on a characteristic of the graphic bus.

2. The system of claim 1, wherein a workload between the first graphics processor and the second graphics processor is shared.

3. The system of claim 1, wherein the first graphics processor and the second graphics processor are communicatively coupled through the graphic bus.

4. The system of claim 3, further comprising a plurality of high speed connection busses wherein said plurality of high speed connection busses connect the memory controller, the system memory, the second graphics processor, and a central processor, and wherein the plurality of high speed connection busses are configured to provide greater data transfer bandwidth compared to the graphic bus.

5. The system of claim 4, wherein the local bus is a high performance bus configured to provide greater data transfer bandwidth compared to the plurality of high speed connection busses.

6. A system for coordinated data execution and coordinated graphics processing, said system comprising:
   a primary graphics processor coupled to a local graphics memory via a first local bus;
   a secondary graphics processor coupled to a system memory via a second local bus, wherein the second local bus provides a higher communication bandwidth compared to the first local bus;
   a local graphics bus configured to couple the primary graphics processor and the secondary graphics processor; and
   a graphics driver configured to split a processing workload between the primary graphics processor and the secondary graphics processor, wherein the split of the processing workload between the primary graphics processor and the secondary graphics processor is based on a characteristic of the local graphics bus.

7. The system of claim 6, wherein the primary graphics processor is communicatively connected to the system memory via the local graphics bus, and wherein the local graphics bus provides a lower bandwidth connection compared to the first local bus and the second local bus.

8. The system of claim 6, wherein the secondary graphics processor is integrated with a system memory controller.

9. The system of claim 6, wherein the secondary graphics processor has a faster access to the system memory compared to the primary graphics processor.

10. The system of claim 6, wherein the secondary graphics processor has a greater communications bandwidth with a central processor compared to the primary graphics processor.

11. The system of claim 6, wherein the primary graphics processor is a card-mounted graphics processor configured to connect to an accelerated graphics port (AGP) slot of the graphics bus.

12. The system of claim 6, wherein the secondary graphics processor is configured to perform graphics rendering operations that occur in a first portion of a graphics pipeline, wherein the operations comprise transform, lighting, occlusion culling, back face culling, view frustum culling, or clipping.

13. The system of claim 6, wherein the secondary graphics processor processes commands from a processing thread that is different from the primary graphics processor.

14. The system of claim 6, wherein the secondary graphics processor is a smaller processor compared to the primary graphics processor.

15. The system of claim 6, wherein the primary graphics processor performs graphics rendering operations that occur in a second portion of a graphics rendering pipeline, wherein the graphics rendering operations comprise lighting, bump, mapping, and texture mapping.

16. The system of claim 6, wherein the secondary graphics processor is configured to use a portion of the system memory as a dedicated local memory.

17. A method for coordinated data execution and coordinated operation of graphics processors, said method comprising:
   communicating data between a primary graphics processor and a local graphics memory via a first local bus;
   communicating data between a secondary graphics processor and a system memory via a second local bus, wherein the secondary graphics processor utilizes a higher communications bandwidth with the system memory compared to a communications bandwidth of the primary graphics processor with the local graphics memory;
   communicating data between the primary graphics processor and the secondary graphics processor via a local graphics bus; and
   splitting a processing workload between the primary graphics processor and the secondary graphics processor via a graphics driver, wherein the splitting of the processing workload between the primary graphics processor and the secondary graphics processor is based on a characteristic of the local graphics bus.

18. The method of claim 17, wherein the primary graphics processor is communicatively coupled to the system memory.

19. The method of claim 17, wherein the workload between the primary graphics processor and the secondary graphics processor is split based on the amount of data to be transferred across the local graphics bus.

* * * * *